US007978060B2

(12) United States Patent
Mandava et al.

(10) Patent No.: US 7,978,060 B2
(45) Date of Patent: Jul. 12, 2011

(54) IDENTIFICATION SYSTEM

(75) Inventors: Panduranga Rao Mandava, Pittsburgh, PA (US); Alexander McCredie, Pittsburgh, PA (US)

(73) Assignee: Inteligistics, Inc., Pittsburgh, PA (US)

( * ) Notice: Subject to any disclaimer, the term of this patent is extended or adjusted under 35 U.S.C. 154(b) by 1451 days.

(21) Appl. No.: 11/352,918

(22) Filed: Feb. 13, 2006

(65) Prior Publication Data

US 2006/0192652 A1    Aug. 31, 2006

Related U.S. Application Data

(60) Provisional application No. 60/652,757, filed on Feb. 14, 2005, provisional application No. 60/690,682, filed on Jun. 15, 2005.

(51) Int. Cl.
*G08B 1/08* (2006.01)
*H04Q 5/22* (2006.01)
(52) U.S. Cl. .................. 340/539.1; 340/10.1; 340/10.5; 340/505; 340/572.1; 340/5.8
(58) Field of Classification Search ............... 340/539.1, 340/825.36, 825.49, 10.1–10.5, 505, 572.1, 340/551, 5.8; 705/28; 235/385, 375; 455/422.1, 455/449, 517
See application file for complete search history.

(56) References Cited

U.S. PATENT DOCUMENTS

| | | |
|---|---|---|
| 3,958,102 A | 5/1976 | Burt |
| 4,116,512 A | 9/1978 | Wiser |
| 4,118,693 A | 10/1978 | Novikoff |
| 4,227,037 A | 10/1980 | Layton |
| 4,496,406 A | 1/1985 | Dedow |
| 4,636,634 A | 1/1987 | Harper et al. |
| 4,636,950 A * | 1/1987 | Caswell et al. ............... 705/28 |
| 4,673,932 A | 6/1987 | Ekchian et al. |
| 4,847,764 A | 7/1989 | Halvorson |
| 4,860,918 A | 8/1989 | Wuyten et al. |
| 5,029,183 A | 7/1991 | Tymes |
| 5,194,856 A | 3/1993 | Zijlstra |
| 5,287,414 A | 2/1994 | Foster |
| 5,295,154 A | 3/1994 | Meier et al. |
| 5,389,919 A | 2/1995 | Warren et al. |

(Continued)

FOREIGN PATENT DOCUMENTS

JP    2001052054 A    2/2001

OTHER PUBLICATIONS

Amilda Dymi, *A One-Stop Shopping Trip That Can Pay Off Over Time*; Origination News, New York, Sep. 2003; vol. 12, Iss. 12, p. 5.

*Primary Examiner* — Brian A Zimmerman
*Assistant Examiner* — Nam V Nguyen
(74) *Attorney, Agent, or Firm* — The Webb Law Firm

(57) ABSTRACT

An identification system for recognizing at least one item signal emitting device operating at a first frequency and in operable communication with at least one item. The system includes at least one support member having a support surface for supporting the items thereon and a support member signal emitting device operating a second, different frequency in communication with the support member. The system includes a local signal recognition system with a signal receiving device in communication with the support member for receiving signals therefrom and a control device for receiving, processing and transmitting signals. A transferable local signal recognition system, as well as a networked identification system are also disclosed.

22 Claims, 5 Drawing Sheets

U.S. PATENT DOCUMENTS

| | | | |
|---|---|---|---|
| 5,408,443 | A | 4/1995 | Weinberger |
| 5,410,315 | A | 4/1995 | Huber |
| 5,413,236 | A | 5/1995 | Kenevan |
| 5,431,299 | A | 7/1995 | Brewer et al. |
| 5,495,961 | A | 3/1996 | Maestre |
| 5,565,858 | A | 10/1996 | Guthrie |
| 5,689,238 | A | 11/1997 | Cannon, Jr. et al. |
| 5,713,485 | A | 2/1998 | Liff et al. |
| 5,729,697 | A * | 3/1998 | Schkolnick et al. ............ 705/23 |
| 5,739,765 | A | 4/1998 | Stanfield et al. |
| 5,751,220 | A | 5/1998 | Ghaffari |
| 5,751,221 | A | 5/1998 | Stanfield et al. |
| 5,765,707 | A | 6/1998 | Kenevan |
| 5,771,003 | A | 6/1998 | Seymour |
| 5,774,053 | A | 6/1998 | Porter |
| 5,774,059 | A | 6/1998 | Henry et al. |
| 5,797,515 | A | 8/1998 | Liff et al. |
| 5,801,628 | A | 9/1998 | Maloney |
| 5,804,810 | A | 9/1998 | Woolley et al. |
| 5,857,152 | A | 1/1999 | Everett |
| 5,912,818 | A | 6/1999 | McGrady et al. |
| 5,917,433 | A * | 6/1999 | Keillor et al. ................. 340/989 |
| 5,936,527 | A | 8/1999 | Isaacman et al. |
| 5,950,630 | A | 9/1999 | Portwood et al. |
| 5,993,046 | A | 11/1999 | McGrady et al. |
| 6,075,441 | A | 6/2000 | Maloney |
| 6,112,502 | A | 9/2000 | Frederick et al. |
| 6,116,461 | A | 9/2000 | Broadfield et al. |
| 6,127,928 | A | 10/2000 | Issacman et al. |
| 6,204,764 | B1 | 3/2001 | Maloney |
| 6,296,148 | B1 | 10/2001 | Myers et al. |
| 6,323,782 | B1 | 11/2001 | Stephens et al. |
| 6,392,544 | B1 | 5/2002 | Collins et al. |
| 6,407,665 | B2 | 6/2002 | Maloney |
| 6,424,262 | B2 | 7/2002 | Garber et al. |
| 6,445,297 | B1 | 9/2002 | Nicholson |
| 6,512,459 | B2 | 1/2003 | Benezech et al. |
| 6,512,478 | B1 | 1/2003 | Chien |
| 6,677,857 | B2 | 1/2004 | Bara et al. |
| 6,703,935 | B1 | 3/2004 | Chung et al. |
| 6,707,381 | B1 | 3/2004 | Maloney |
| 6,714,121 | B1 | 3/2004 | Moore |
| 6,718,888 | B2 | 4/2004 | Muirhead |
| 6,745,027 | B2 * | 6/2004 | Twitchell, Jr. ............. 455/422.1 |
| 6,747,558 | B1 * | 6/2004 | Thorne et al. ................. 340/551 |
| 6,750,771 | B1 | 6/2004 | Brand |
| 6,762,676 | B2 * | 7/2004 | Teowee et al. ............. 340/426.1 |
| 6,826,514 | B1 * | 11/2004 | Antico et al. ................. 702/188 |
| 6,870,464 | B2 | 3/2005 | Okamura |
| 6,927,688 | B2 * | 8/2005 | Tice ......................... 340/539.26 |
| 6,943,678 | B2 | 9/2005 | Muirhead |
| 6,989,749 | B2 | 1/2006 | Mohr |
| 7,009,518 | B2 | 3/2006 | Liao et al. |
| 7,088,229 | B2 * | 8/2006 | Johnson ........................ 340/505 |
| 7,098,784 | B2 * | 8/2006 | Easley et al. ............. 340/539.13 |
| 7,126,926 | B1 | 10/2006 | Bjorklund et al. |
| 7,130,773 | B1 | 10/2006 | Wong |
| 7,152,791 | B2 | 12/2006 | Chappidi et al. |
| 7,187,287 | B2 | 3/2007 | Ryal |
| 7,233,620 | B2 | 6/2007 | Brommer |
| 7,256,682 | B2 | 8/2007 | Sweeney, II |
| 7,286,043 | B2 | 10/2007 | Carrender et al. |
| 7,298,243 | B2 | 11/2007 | Juels et al. |
| 7,310,045 | B2 | 12/2007 | Inui |
| 7,348,884 | B2 | 3/2008 | Higham |
| 7,420,458 | B1 | 9/2008 | Kuzma et al. |
| 7,433,648 | B2 | 10/2008 | Bridgelall |
| 2001/0002448 | A1 | 5/2001 | Wilson et al. |
| 2001/0028308 | A1 | 10/2001 | De La Huerga |
| 2001/0034613 | A1 | 10/2001 | Rubsamen |
| 2001/0044731 | A1 | 11/2001 | Coffman et al. |
| 2002/0027507 | A1 | 3/2002 | Yarin et al. |
| 2002/0038167 | A1 | 3/2002 | Chirnomas |
| 2002/0063622 | A1 | 5/2002 | Armstrong et al. |
| 2002/0113082 | A1 | 8/2002 | Leatherman et al. |
| 2002/0143320 | A1 | 10/2002 | Levin |
| 2002/0145520 | A1 | 10/2002 | Maloney |
| 2002/0153411 | A1 | 10/2002 | Wan et al. |
| 2002/0183882 | A1 | 12/2002 | Dearing et al. |
| 2002/0190871 | A1 | 12/2002 | Stanfield et al. |
| 2003/0030539 | A1 | 2/2003 | McGarry et al. |
| 2003/0034390 | A1 | 2/2003 | Linton et al. |
| 2003/0117281 | A1 | 6/2003 | Sriharto et al. |
| 2003/0160698 | A1 | 8/2003 | Andreasson et al. |
| 2003/0164401 | A1 | 9/2003 | Andreasson et al. |
| 2003/0174099 | A1 | 9/2003 | Bauer et al. |
| 2004/0046020 | A1 | 3/2004 | Andreasson et al. |
| 2004/0069850 | A1 | 4/2004 | De Wilde |
| 2004/0069852 | A1 | 4/2004 | Seppinen et al. |
| 2004/0111335 | A1 | 6/2004 | Black et al. |
| 2004/0155003 | A1 | 8/2004 | Anderson et al. |
| 2004/0168618 | A1 | 9/2004 | Muirhead |
| 2004/0267545 | A1 | 12/2004 | Buchmann et al. |
| 2005/0088284 | A1 | 4/2005 | Zai et al. |
| 2005/0088305 | A1 | 4/2005 | Greene et al. |
| 2005/0093679 | A1 | 5/2005 | Zai et al. |
| 2005/0237184 | A1 | 10/2005 | Muirhead |
| 2005/0241548 | A1 | 11/2005 | Muirhead |
| 2005/0280539 | A1 | 12/2005 | Pettus |
| 2006/0022800 | A1 | 2/2006 | Krishna et al. |
| 2006/0056370 | A1 | 3/2006 | Hancock et al. |
| 2006/0058018 | A1 | 3/2006 | Toulis et al. |
| 2006/0092040 | A1 | 5/2006 | Fishkin et al. |
| 2006/0109084 | A1 | 5/2006 | Yarvis |
| 2006/0143439 | A1 | 6/2006 | Arumugam et al. |
| 2006/0215593 | A1 | 9/2006 | Wang et al. |

* cited by examiner

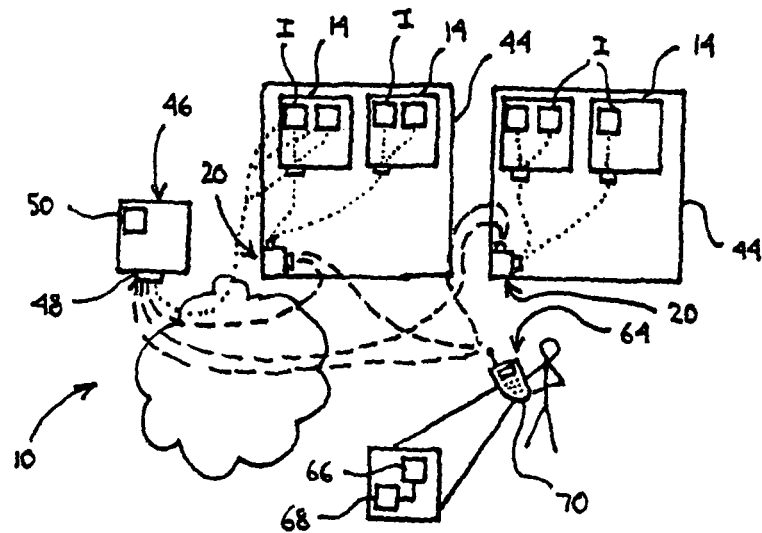
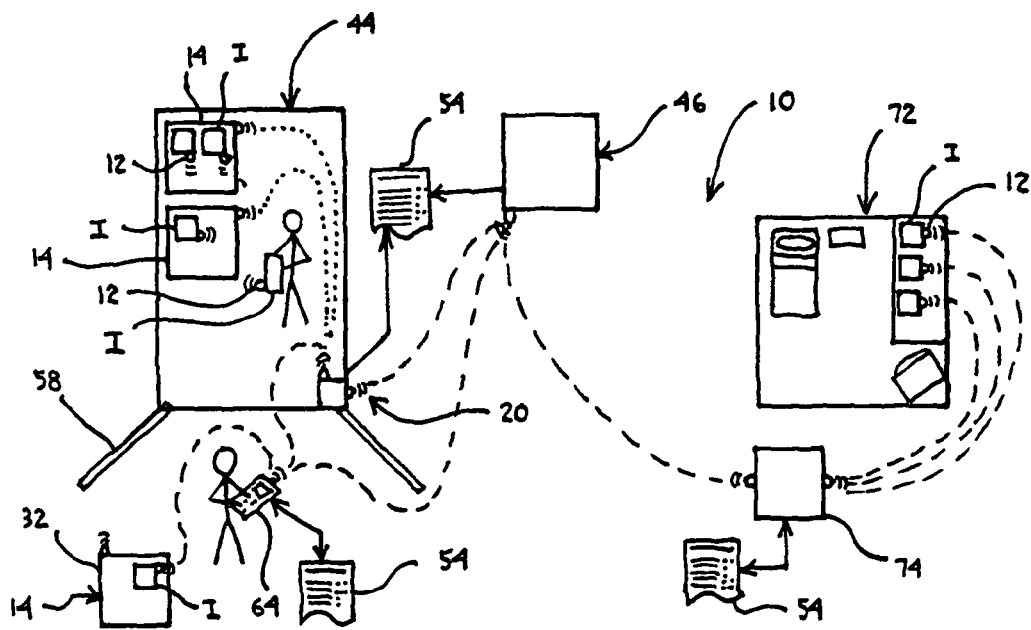

IDENTIFICATION SYSTEM

CROSS REFERENCE TO RELATED APPLICATIONS

This application claims the benefit of priority from U.S. Provisional Patent Application Nos. 60/652,757, filed Feb. 14, 2005, and 60/690,682, filed Jun. 15, 2005, which are incorporated herein by reference in their entirety.

STATEMENT REGARDING FEDERALLY SPONSORED RESEARCH

This invention was made with Government support under Contract N00014-05-M-0076awarded by the Department of the Navy. The Government has certain rights in the invention.

BACKGROUND OF THE INVENTION

1. Field of the Invention

The present invention relates generally to identification and/or recognition systems, such as supply chain management systems and radio frequency identification systems, which are useful in tracking items, inventory and the like, and in particular, to an intelligent system for tracking and reporting the items, methods and systems for nesting differing radio frequencies and antennae, and unique arrangements in the field of RFID tags, readers and associated systems.

2. Description of the Related Art

There are presently logistical systems for use in connection with large corporate and governmental entities, and these systems must be capable of moving large amounts of material, equipment, ammunition, pre-packaged service modules, products, objects, goods and other items. The logistics of this effort require a system that can manage the movement of goods from supplier-to-consolidation point, shore-to-ship, ship-to-ship, ship-to-shore, shore-to-inland theatres of operations, and from a point of origin to various desired destinations and locations. Accordingly, such a supply chain management system must be designed to allow for real-time accountability, Total Asset Visibility (TAV), and in some applications, rapid deployment and In-transit Visibility (ITV).

Radio frequency identification (RFID) is a non-contact, proximity-based, automatic identification and information technology that does not require manual scanning. An RFID transponder (referred to as an "RFID tag" or "tag"), RFID interrogator (referred to as a "reader") and attached antenna are the main components of any RFID system. The tag is normally attached to an item to be identified and communications occur via over-air protocols, securely transmitting data to central processing software. An RFID transponder normally consists of a silicon chip (EEPROM) attached to an etched antenna. In operation, as the tag passes through the field, it is activated and, depending on the command of the reader, when the tag is commanded to send its stored information over the air, it is received by the Interrogator Antenna and then forwarded to the RFID Reader to decode the Radio Frequency Signal. Typically, the RFID Reader is hooked up to an Information System backbone, to which it transmits the information from the tag.

According to the prior art, the silicon chip is composed of an RF to DC power conversion component, a digital component for storage and processing of the ID number, and an RF transmitter. Other components may be included to enable frequency hopping schemes, amplification of the output signal, and other additional features. The antenna on the transponder is then externally powered by an RFID interrogator and in sequence transmits the information from the chip through the air to the interrogator.

The tags come in a variety of forms for use in different environments, from fingernail size to 8.5×11 inches. The size of the tag can affect its read ranges, and the antenna determines the size of the tag, occupying more than 95% of a given transponder. The frequency of the antenna is indirectly proportional to the size of the antenna, therefore, the use of higher frequencies can enable smaller antennas to be used. Another antenna characteristic that can greatly affect the size of an antenna is its wavelength. Due to the lack of space on a tag, a ¼ wavelength is usually used. If transmission distance is more important than the tag size, then a ½ wavelength can be used. Interrogator antennae come in many shapes and sizes, which also affect the read-range and pick up rate.

Unlike the bar code, the RFID tag does not have to be in line-of-sight in order to be read. Additionally RFID provides several advantages over existing methods for identification. First, no manual scanning or data entry is required to identify the object for processing. The processing occurs automatically. Second, multiple items can be read via a single scan. RFID is much more durable than bar codes. Because of its non-line-of-sight nature, RFID labels can be read when covered by dirt or grease, or scratched.

Finally, one substantial advantage of RFID technology is its read/write capability and its storage capacity. Unlike the bar code, from which only a static "license plate" number can be read, information can be written to the 96 b-2000 b (2 k) chip embedded in the RFID tag. This enables the tag to act as a local, portable database that travels with the item. This capability allows much less complex and inhibitive system architectures to be designed, as an interface into a master database is not required with every read.

The main RFID hardware components consist of readers and tags. Several types of RFID readers exist, from built-in and fixed to mobile and handheld, that work with different radio frequencies, from low frequency to microwave. RFID readers are connected to enterprise applications like ERP and SCM through middleware. RFID readers first read the data of the RFID tag (such as an Electronic Product Code (EPC)) and also read any additional data such as product description and expiration date. Once this data is collected, the software in the reader can validate the data via a back-end system.

An added layer of difficulty arises from the use of various RFID frequencies. Globally, there are many regulatory bodies that are responsible for frequency standards, such as the FCC in the US; ERO, CEPT, and ETSI in Europe; MPHPT in Japan; and the Ministry of Information Industry in China. RFID technology uses six main frequencies. The low frequency (125 KHz to 134 KHz) is the most mature band in use for RFID, but is limited by its short range, which makes it hard to use for unguided moveable objects like pallets and cases. High Frequency (HF, 13.56 MHz) is used mainly in RFID readers. High Frequency has been used extensively in the contactless smart card arena and has been the choice of many systems for shorter range RFID. It is very appropriate for item-level tags. This frequency only works for distances of less than one meter but it has global regulation that is almost identical, making it a great choice for global commerce. Ultra-High Frequency (UHF, 860 MHz to 960 MHz) is available for use in pallet and case scanning. UHF works well at distances of three to five meters. However, UHF is limited by restrictions from different countries, which forces the reader manufacturers to produce region-specific readers and makes certification necessary on a per region basis. The other frequency band of interest is the 433 MHz band where many of the Active RFID systems operate.

There is an overwhelming need for international coordination of RFID tags and readers. The different international frequency spectrum makes it impossible to mark an object with one RFID tag and use that tag at its international destination with a different acceptable frequency. Presently, a passive tag needs to be placed on an object for a corresponding, accepted frequency associated with each interrogation point in its route. Further, when traveling from international port-to-port the accepted frequencies vary. RFID technology in one country may interfere or violate standards of another country. For example, in many instances, the current RF tags cannot be used after it is outside of its initial country. Still further, active tags either run continuously, in a timed or can be turned on by a second, trigger frequency. Accordingly, a "smart" device is required to deliver this second frequency, and if the device is continuously draining the battery, the lifespan of the battery would be drastically limited.

There are two main types of tags, namely passive tags and active tags. Passive tags are preferred because they do not require a power source and are relatively inexpensive. Passive tags make labeling of inventory simple since they are relatively thin and usually come on adhesive-backed paper. Further, passive tags also provide easy receipt/issue automation and are predominantly available in frequency ranges of 13.56 MHz (high frequency) and 850 to 950 MHz (ultra high frequency). Both are suitable for supply chain management. Active tags are battery powered, bulky and more expensive. They have a limited life expectancy due to the battery charge considerations, however, these tags can read from greater distances and can be set up to monitor external environmental sensors and report the information.

According to the prior art, it has been demonstrated that a supply chain management system operating at a frequency of 13.56 MHz is effective and highly accurate. However, tags operating at this frequency require the reader to be positioned quite close to the tag for effective recognition and identification. Accordingly, tags operating at a 915 MHz frequency are recognizable by a reader positioned at a greater distance from the tag, which allows for a larger scanning area. However, tags operating at this frequency have proven less accurate (producing false "reads") than tags operating at the 13.56 frequency.

In general, while there are many different inventory and asset management systems available, these systems only provide limited information, which translates into limited asset visibility. Accordingly, these prior art systems and arrangements do not allow for a true end-to-end asset (or inventory) management system that can be used both at a local position, but throughout the world. It is estimated that over 12 million cargo containers enter the United States each year, and over 5% of all container movements in the world develop problems during transit. The containers are misrouted, stolen, damaged or excessively delayed as a result of human error or carelessness (*Wall Street Journal*, Jan. 05, 2004). A problem of illegal diversion of pallets/containers of goods being shipped to international markets exists. These goods are returning to the United States and other countries on the "Black Market".

In order to track assets or items on a global level, prior art system rely on the confusing and complex interconnectivity between inventory and tracking systems, which are based on different platforms, different computing systems, and include different terminology and data management. Accordingly, such prior art systems are remit with inaccuracies, inconsistencies, malfunctions, poor communication and result in a severely limited data set regarding the items and assets to be tracked and recognized.

SUMMARY OF THE INVENTION

Accordingly, it is an object of the present invention to provide a recognition system that overcomes the deficiencies, drawbacks and shortcomings of the prior art and convention recognition, identification and inventory system. It is another object of the present invention to provide a recognition system that allows for the effective nesting of differing radio frequencies within the structural arrangements in order to enable effective inventory and asset management. It is yet another object of the present invention to provide a recognition system that provides a networked system of local identification systems and objects for use in total asset visibility and inventory management. It is a still further object of the present invention to provide a recognition system that provides a transferable and compartmentalized unit for installation, removal and transfer between shipping units and containers.

Accordingly, the present invention is directed to an identification system for recognizing at least one item signal emitting device operating at a first frequency and in operational communication with at least item. The system includes at least one support member having (i) at least one support surface configured to support the at least one item thereon; and (ii) at least one support member signal emitting device operating at a second, different frequency and in operational communication with the at least one support member. A local signal recognition system is included and has: (i) a signal receiving device in communication with the at least one support member for receiving signals emitted from the at least one item signal emitting device, the at least one support member signal emitting device or any combination thereof; and (ii) a control device for receiving, processing and transmitting signals.

The present invention is further directed to an identification system for recognizing at least one signal emitting device in operational communication with at least one item. The system includes at least one shipping container having an interior area configured to contain the at least one item therein, and a signal recognition system. The signal recognition system includes: (i) a signal receiving device in communication with the interior area of the shipping container for receiving signals emitted from the at least one signal emitting device; (ii) a control device for receiving, processing and transmitting signals; and (iii) a housing for at least partially contain the signal receiving device and the control device. The housing is portable and attachable to a surface of the shipping container, and is removable and transferable from the shipping container.

The present invention is further directed to an identification system for recognizing at least one signal emitting device in operational communication with at least one item. The system includes at least one of shipping container having an interior area for containing the at least one item therein, and a signal recognition system. The signal recognition system includes: (i) a local signal receiving device in communication with the interior area of the at least one shipping container for receiving signals emitted from the at least one signal emitting device; and (ii) a control device for receiving, processing and transmitting signals. A network system is also included, and has: (i) a signal receiving device in communication with the signal recognition system of the at least one shipping container for receiving signals emitted from the signal recognition system; and (ii) a control device for receiving, processing and transmitting signals.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 6 is a schematic view of a further embodiment of a recognition system according to the principles of the present invention;

FIG. 7 is a schematic view of a still further embodiment of a recognition system according to the principles of the present invention;

DETAILED DESCRIPTION OF THE PREFERRED EMBODIMENTS

Figure 1:
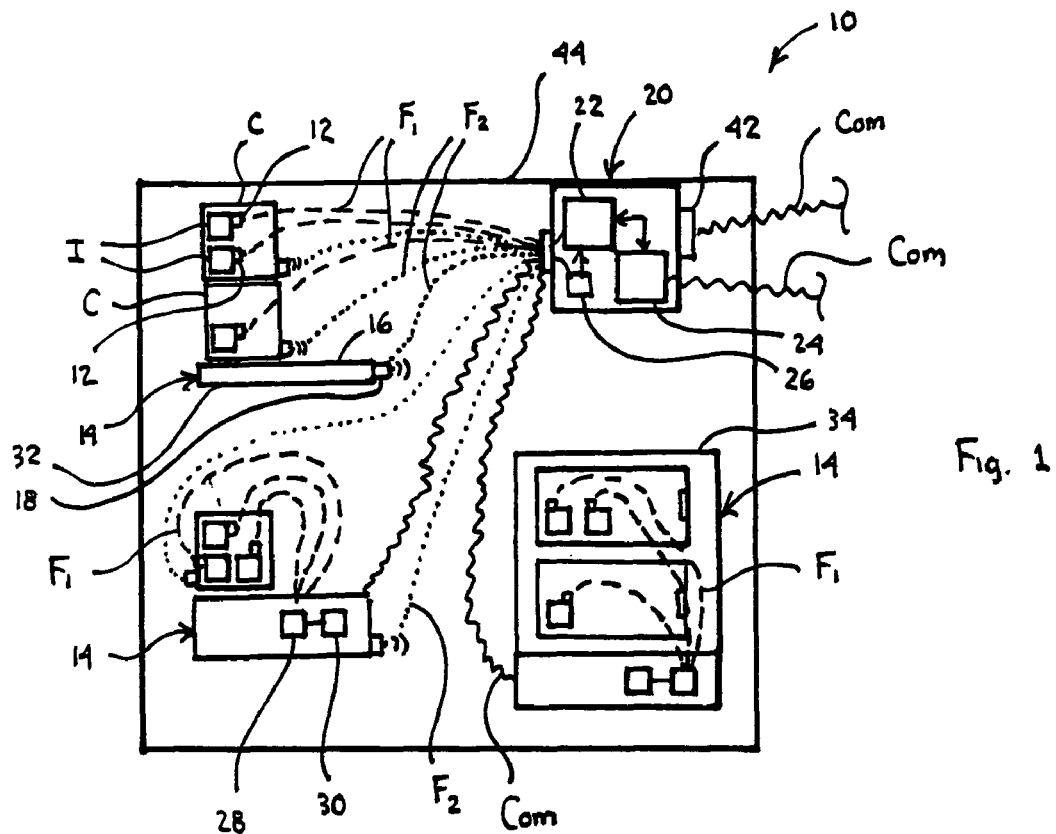
FIG. 1 is a schematic view of one embodiment of a recognition system according to the principles of the present invention.
Figure 2:
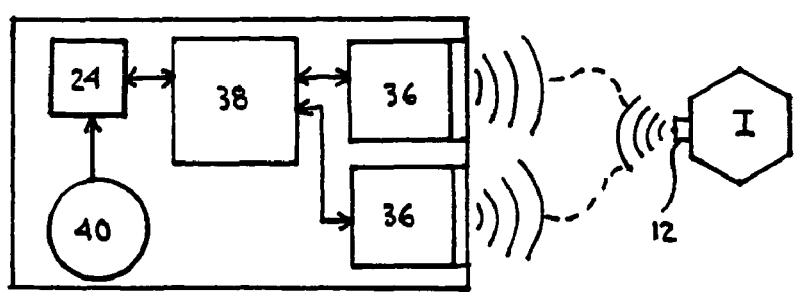
FIG. 2 is a schematic view of another embodiment of a recognition system according to the principles of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Other than in the operating examples or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The present invention is directed to an identification system 10 for use in connection with an inventory or supply chain management system. Various preferred and non-limiting embodiments of the identification system 10 of the present invention, together with preferred arrangements, communications, systems, components and subcomponents, are illustrated in FIGS. 1-11. In particular, the identification system is used to recognize at least one, and typically multiple, item signal emitting devices 12, which are in operational communication with a respective item I or a group of items.

As is known in the art, the item signal emitting device 12 may be in the form of a tag or transponder, which is attached to the item I and configured to provide data signals that are associated with the item I. For example, in an inventory system, the signal emitting device 12 would emit a unique identification and other similar data associated with the item I. As discussed hereinafter, it is envisioned that the signal emitting device 12 can be in the form of a passive tag, an active tag, or some hybrid tag capable of emitting data signals. In one preferred embodiment, however, the item signal emitting device 12 is a passive tag that requires some interrogation signal or powered communication from a separate device in order to activate the tag and emit the desired signal.

In one embodiment, the item signal emitting device 12 is operating at a first frequency $F_1$. In this embodiment, the identification system 10 also includes at least one support member 14, which includes at least one support surface 16 for supporting the item I thereon or therein. As discussed hereinafter, the support member 14 may take many different shapes, sizes and configurations. Further, in this embodiment, the support member 14 includes at least one support member signal emitting device 18 in operational communication with the support member 14. As discussed above, the signal emitting device 18 may be in the form of a tag. In addition, the support member signal emitting device 18 is operating at a second, different frequency $F_2$.

The identification system 10 also includes a local signal recognition system 20. This system 20 includes a signal receiving device 22, which is in communication with the support member 14 and is configured or adapted to receive signals emitted from the item signal emitting device 12, the support member signal emitting device 18, etc. In addition, the local signal recognition system 20 includes a control device 24 for receiving, processing and transmitting signals.

As shown in FIG. 1, many various arrangements and signal paths are envisioned for effecting the appropriate communication and data transfer between the various components of the identification system 10. As discussed above, the signal emitting devices 12, 18 may operate at different frequencies $F_1$, $F_2$. While, in one embodiment, the first frequency $F_1$ and the second frequency $F_2$ are radio frequencies, where the first frequency $F_1$ is about 13.56 MHz and the second frequency $F_2$ is about 915 MHz, any number of frequencies is usable in this system. In this regard, the signal recognition system 20 may also include a configurable tuning mechanism 26. This tuning mechanism 26 is in communication with the signal receiving device 22. Further, the tuning mechanism 26 can be modified to receive multiple different signals having different and discrete frequencies. Accordingly, the local signal recognition system 20 can be used in many different situations and applications throughout the world regardless of the required operating frequency. It is the tuning mechanism 26 that allows for the receipt and processing of a variety of signals operating at different frequencies.

It is further envisioned that, while radio frequency is use for data transfer in one preferred embodiment of the present invention, any number of signal types is envisioned. A variety of wireless signal types can be used in connection with the identification system 10. For example, the data signals may be in the form of radio frequency signals, infrared signals, barcode signals, wireless signals, hardwired signals, etc. However, as discussed above in one preferred embodiment, the nesting of the two different frequencies $F_1$, $F_2$ provides a comprehensive "look" at the overall inventory of the entire identification system 10, and in the case of radio frequency, complies with the vast majority of signal recognition standards and regulations.

As discussed above, the signal emitted from the item signal emitting device 12 may be 13.56 MHz, and the signal emitted from the support member signal emitting device 18 may be 915 MHz. Accordingly, the first frequency $F_1$ is at the "item" level, and the second frequency $F_2$ is at the "support member" level. The use of these frequencies allows for appropriate recognition and accuracy with respect to the distances between the signal emitting devices 12, 18 and the signal receiving device 22.

In another embodiment, the support member 14 includes a support member signal receiving device 28, which is in communication with and configured to receive signals emitted from the item signal emitting device 12 and/or the support member signal emitting device 18. Further, in this embodiment, the support member 14 includes a support member control device 30. The support member control device 30 allows the support member 14 to receive, process and transmit signals. In addition, the support member control device 30 may be configured for communication with the local signal recognition system 20.

Some preferred arrangements are illustrated in FIG. 1. For example, the support member 14 may be in the form of a pallet 32 or cabinet 34. In addition, the items I may be placed within a carton C, which is then place on or positioned on the pallets 32. Accordingly, the support member 14 may also be in the form of the carton C, which as discussed above, includes a support member signal emitting device 18. Any number of such configurations is envisioned.

As seen in FIG. 1, the signal receiving device 22 may obtain all signals emitted from the items I, cartons C and support member 14. In this embodiment, both the cartons C and support member 14 (in the form of a pallet 32) operate at the second frequency $F_2$, and the items I operate at the first frequency $F_1$. All these signals may be transmitted directly to the signal receiving device 22 of the local signal recognition system 20.

Also seen in FIG. 1 is a pallet 32 containing the signal receiving device 28 and control device 30. In this arrangement, the item signal emitting devices 12 or tags emit data that is captured locally by the support member signal receiving device 28. This information or data may be provided to the signal receiving device 22 of the local signal recognition system 20 via a communication signal (Com). As discussed in detail hereinafter, the communication signal (Com) may take many forms, whether hardwired, contact, wireless, etc. Further, any of the signals discussed for use in connection with the identification system 10 may take such a form.

As illustrated in FIG. 1, a cabinet 34 arrangement may also be utilized. In this arrangement, the item signal emitting devices 12 provides a data signal to the support member signal receiving device 28, which, again, provides a communication signal (Com) to the signal receiving device 22 of the local signal recognition system 20.

The signal receiving device 22 of the local signal recognition system 20 may take many forms. As seen in one preferred embodiment in FIG. 2, the signal receiving device 22 is in the form of two antennae 36, which are in communication with a reader device 38. In operation, the antennae 36 project a magnetic field, which activates the item signal emitting device 12 (or RFID tag), which, in turn, projects a signal back through the antennae 36 and to the reader device 38. Further, the reader device 38 is in communication with the control device 24 discussed above. In order to provide power or current to the system, a power supply 40 may be used. However, as discussed in greater detail hereinafter, any of the components or subcomponents of the identification system 10 may be directly powered, remotely powered, actively emitting a signal, emitting a signal only upon a trigger event, etc.

In one example, the local signal recognition system 20 may emit a communication signal (Com) only upon appropriate interrogation or request. In this regard, the local signal recognition system 20 may include a signal emitting device 42. However, it is also envisioned that the control device 24 could also function to emit or transmit a communication signal (Com) with the appropriate authorization, interrogation or validation of the source.

One purpose of permitting signals to emanate from the system 10 only upon appropriate interrogation is security. If all of the tags used in the system 10 are, for example, passive tags, and the local signal recognition system 20 (or support member 14) only release a signal upon authorized interrogation, such signals could not be captured or intercepted by an unauthorized third party. In one embodiment, the control device 24 (or control device 30) only emits or begins transmission of a signal, such as the communication signal (Com), when some authorization signal is received.

FIG. 1 also illustrates the placement of the local signal recognition system 20 on, in or in operational communication with a shipping container 44. For example, the shipping container 44 may be a 20-foot equivalent unit (TEU) or similar mass-produced and commonly-used container. Such shipping containers 44 are used to transport goods, equipment, etc. by land, sea and/or air. The local signal recognition system 20 may be used in connection with such a shipping container 44, which includes one or more support members 14 therein (e.g., pallets 32, cabinets 34, etc.), each having multiple cartons C and/or items I placed thereon or therein. Accordingly, the local signal recognition system 20 is configured to fully recognize and accurately identify the inventory of items I, cartons C, pallets 32, cabinets 34, support members 14, etc.

The control device 24 of the local signal recognition system 20 and/or the control device 30 of the support member 14 can be programmed with software for enabling the system 10 to engage in the appropriate recognition and communication functions. This software may be in the form of a user interface or other programmable code, but may also be in the form of some appropriate circuitry, hardware or other permanent or semi-permanent architecture. It is the software that enables for the appropriate recognition and data processing functions.

The software system may be used to identify, recognize or otherwise understand the data associated with a shipping container 44 identity, an item I identity, a support member 14 identity, a signal emitting device identity, data associated with a shipping container 44, data associated with an item I, data associated with a support member 14, data associated with a signal emitting device, a default inventory, an updated inventory, an item I inventory, a support member 14 inventory, user data, access data, user/item association data, user/support member association data, user/shipping container data, a default data set, an updated data set, shipping data, location data, point-of-origin data, destination data, product data, expiry data, recall data, product demand data, condition data, system data, environmental data, sensed condition data, sensed characteristic data, physical state data, physical condition data, chemical state data, chemical condition data, status data, warning data or any combination thereof.

In addition, the software system provides for the capability of the control devices 24, 30 to communicate data to a specified destination in a wireless format, such as over a network. For example, specified data may be transmitted in a satellite network, a cellular phone network, a computer network, the Internet, a web-based application, in a wireless format, a hardwired format, over a local area network, over a wide area network, over a wireless local area network (Wi-Fi), etc. As another example, and in a hardwired format, it is envisioned that the control devices 24, 30 may include the appropriate ports or other communications connections for directly transferring data to another system, device or subcomponent.

In another preferred and non-limiting embodiment, the identification system 10 includes a network system 46. The network system 46 includes a signal receiving device 48, which is in communication with the local signal recognition system 20 and/or the support member 14. In addition, the network system 46 includes a control device 50 for use in receiving, processing and transmitting signals. As discussed above in connection with the control devices 24, 30, the control device 50 may also be programmed with software for enabling the system to appropriately recognize, read and otherwise manipulate data transmitted within the identification system 10.

Figure 3:
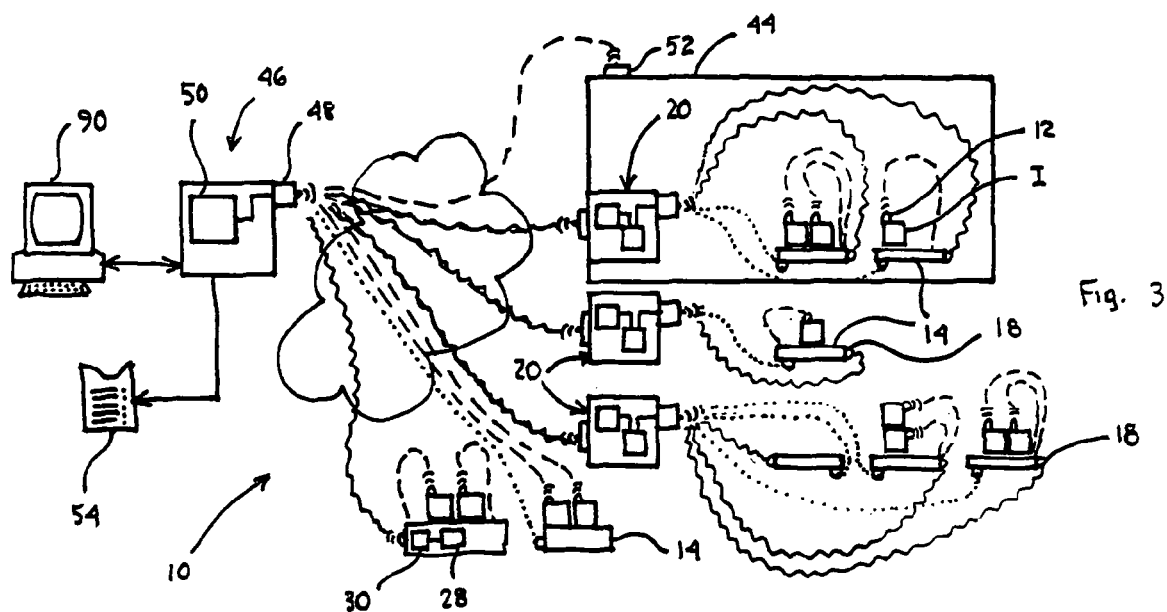
FIG. 3 is a schematic view of a further embodiment of a recognition system according to the principles of the present invention.

Accordingly, the network system 46 receives signals from the control devices 24, 30 and/or the signal emitting devices 12, 18. In this embodiment, it is also envisioned that the shipping container 44 includes a further and distinct signal emitting device 52 for use in obtaining information about the container 44 itself. Accordingly, dependent upon the arrangement of communications, and dependent upon the use of active tags, passive tags or other communications devices, the network system 46 is capable of obtaining data regarding all of the components of the identification system 10. As seen in FIG. 3, it is the network system 46 that provides for the total asset visibility by acting as the central depository database of all appropriate collected signals, data and information. It is also envisioned that the network system 46 is some onsite system (such as on a campus, a field operation, etc.), and this local network system 46 represents a node in communication with a larger, all-encompassing network system 46. Accordingly, any hierarchy is envisioned for providing seamless and effective communication not only at the site, but throughout the world.

As discussed above, and as further illustrated in FIG. 3, the data regarding any particular item I, carton C, support member 14, pallet 32, cabinet 34, shipping container 44, as well as all data associated with any of the storage media, tags, emitting devices, etc. associated therewith, can be communicated, whether directly or indirectly, with the network system 46. Accordingly, regardless of whether the various components are operating at different frequencies, it is the "node" concept that lends additional novelty to the present invention. Accordingly, any individual item I can be tracked to the shipping container 44, support member 14, pallet 32, cabinet 34 and carton C level.

Based upon the information and data collected by the network system 46, appropriate reports may be created. In particular, the control device 50 of the network system 46 may be programmed with software configured to output a detailed manifest 54, including data, a shipping container 44 identity, an item I identity, a support member 14 identity, a signal emitting device identity, data associated with the shipping container 44, data associated with an item I, data associated with a support member 14, data associated with a signal emitting device, a default inventory, an updated inventory, an item inventory, a support member inventory, user data, access data, user/item association data, user/support member association data, user/shipping container data, a default data set, an updated data set, shipping data, location data, point-of-origin data, destination data, product data, expiry data, recall data, product demand data, condition data, system data, environmental data, sensed condition data, sensed characteristic data, physical state data, physical condition data, chemical state data, chemical condition data, status data, warning data or any combination thereof. This manifest 54 may be provided in hardcopy or electronic form. In addition, this manifest can be associated with and transferred back to or along with any particular shipping container 44, support member 14, item I, etc. Therefore, the manifest 54 can move with the shipping container 44 or support member 14 throughout the system for use in further inventory events. Still further, the manifest 54 could be created by any of the various components and portions of the overall system 10.

The network system 46 may be at a variety of specified destinations. For example, the network system 46 may act as a data repository, and be located at a website, online, on a computing device, on a computer, on a personal computer, on a laptop, on a palmtop, on a personal digital assistant, on a cellular phone, on an electronic device, on a network terminal, etc. In addition, it is envisioned that the signal receiving device 22 of the local signal recognition system 20 may be configured to receive and read the item signal emitting device 12 operating at the first frequency $F_1$ and the support member signal emitting device 18 operating at the second frequency $F_2$ simultaneously.

Figure 4:
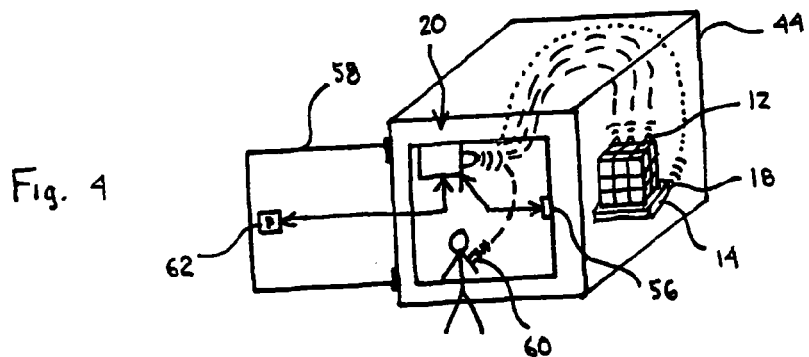
FIG. 4 is a schematic view of another embodiment of a recognition system according to the principles of the present invention.

It is further envisioned that the signal receiving device 22 of the local signal recognition system 20 is an event-activated device, such that a scan is activated based upon a specified event or occurrence. For example, this event or occurrence may be a prompt from a network (such as the network system 46), a prompt from an outside control device, a prompt from the system 10, an activation event, an access condition, an entry condition, an identity condition, an authorization condition, a non-event condition, etc. As seen in FIG. 4, the identification system 10, and in particular the shipping container 44, may include a sensor 56. This sensor 56 may trigger the signal receiving device 22 to engage in a scan of its contents. For example, a sensor 56 may be a motion sensor, which senses the entry of an individual, or a sensor that senses the opening or closing of a door 58 of a shipping container 44. Accordingly, when the door 58 is opened or closed, or an individual enters the shipping container 44, a scan of the contents occurs. Accordingly, and items I that are added or removed are sensed by the system 20 (or the support member 14 in communication with the system 20), and these activities may be associated with a specific user.

In another embodiment, and as also seen in FIG. 4, a signal emitting device 60 may be placed on or in communication with an individual. For example, this signal emitting device 60 may be in the form of a tag, an identification badge or other data source that provides signals associated with authorization of an individual to enter the shipping container 44, place or remove items I, cartons C, support members 14, the local signal recognition system 20, etc. Accordingly, the local signal recognition system 20, and specifically the control device 24, may include the appropriate software to recognize and authorize an individual to any level of activity required.

In order to ensure against unauthorized entry, identification system 10 may include an appropriate security system 62. For example, the security system 62 may be in the form of locks, electronic locks, magnetic locks, etc., which may be in communication with the control device 24 of the local signal recognition system 20. Therefore, and by using the signal emitting device 60, the individual may require some engagement with the security system 62 prior to authorized entry into the shipping container 44. Any number of security features, functions and arrangements are envisioned. For example, in order to ensure that signals do not emanate from the shipping container 44, the container 44 may include appropriate shielding or other signal-blocking layers or materials.

Figure 5:
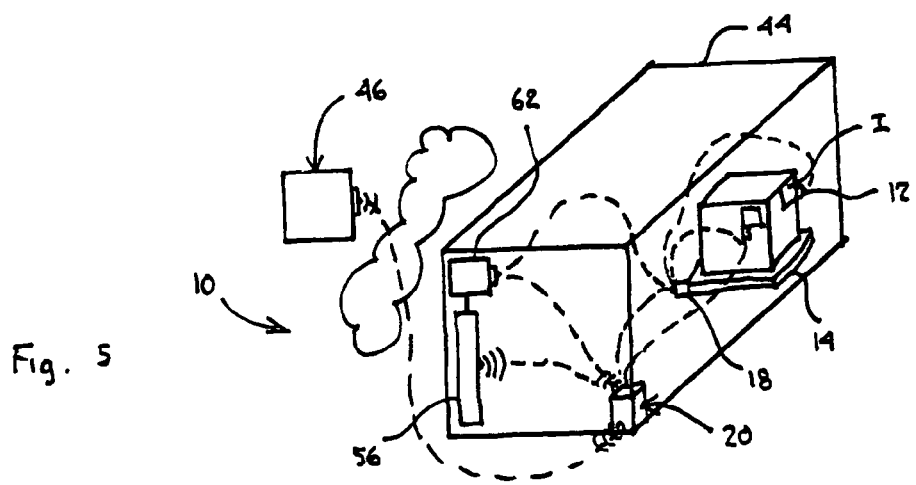
FIG. 5 is a schematic view of yet another embodiment of a recognition system according to the principles of the present invention.

Also, as seen in FIG. 5, the use of the sensors 56, security system 62 and other local communication systems, can be used in connection with the above-discussed network system 46. For example, these various components and subsystems may be in communication with the control device 24 of the local signal recognition system 20, which is, in turn, in communication with the network system 46. The communications between these components may be chosen and optimized based upon the level of recognition required, positioning of the various systems, speed of communication required, etc.

In one embodiment, the support member 14 (pallet 32, cabinet 34, etc.) includes the signal emitting device 18 in the form of a tag operating at the second frequency $F_2$ of 915 MHz. The signal emitting device 18 is a passive tag that has been programmed with the appropriate manifest 54 of items I and/or cartons C supported thereon. Similarly, such a manifest 54 (and the information included therein) can be placed on the signal emitting device 52 of the shipping container 44, also for use as a local manifest 54 document.

However, in this embodiment, the items I, and specifically the signal emitting device 12 for each item I, operates in the first frequency $F_1$ of 13.56 MHz. Operating at this frequency, the items I are easily trackable at a close position, while the pallets 32 and cabinets 34 are trackable through a local signal recognition system 20 placed at a greater distance therefrom.

When using this nesting of frequencies $F_1$, $F_2$, in one preferred and non-limiting embodiment of the present invention, the identification system 10 also includes a portable signal recognition system 64 or device. This system 64 includes a signal receiving device 66, which is in communication with the support member 14 and capable of receiving signals emitted from the support member signal receiving device 18 and/or item signal receiving device 12. In addition, the portable signal recognition system 64 includes a control device 68 for receiving, processing and transmitting signals.

Various embodiments of this portable signal recognition system 64 are illustrated in FIGS. 6 and 7. Specifically, as seen in FIG. 6, the portable signal recognition system 64 may be in the form of a handheld device 70 or "scratchpad", which can be used to communicate with the support members 14, the shipping containers 44, the items I, the cartons C, etc. For example, as seen in FIG. 6, the items I, or specifically the signal emitting devices 12 of the items I, are in communication with the support member signal receiving device 28 and control device 30, and the support member 14 is therefore in contact with the local signal recognition system 20 and/or the network system 46. Accordingly, in this embodiment, the portable signal recognition system 64 is in communication with the local signal recognition system 20 and gathers information and data therefrom. Still further, this portable signal recognition system 64 may be in communication with the network system 46, or otherwise may act as the network system 46 for receiving signals and data from the shipping container 44, support member 14, cartons C, items I, etc.

The use of this portable signal recognition system 64 in combination with the network system 46 is illustrated in FIG. 7. In operation, an authorized person, such as a person authorized by the appropriate signal emitting device 60, is allowed entry to the shipping container 44 through the doors 58. This person, or another authorized person, removes items I from a respective support member 14, and further removes a portion of the items I from the shipping container 44. Each removed item I or group it items I are recognized and associated with such removal by the portable signal recognition system 64. In addition, this removal can be associated with the remover or user, such as by the signal emitting device 60. Next, the user places the item I onto an outside support member 14, such as a deployment pallet 32 or the like. In this manner, the user builds a new inventory of items I, which are associated with this specific support member 14 (or pallet 32).

In order to rectify or resolve the overall inventory of the entire identification system 10, the portable signal recognition system 64 can be in communication with the network system 46 or, alternatively or in addition to, the local signal recognition system 20 may be in communication with the network system 46. In one example, the signal emitting devices 18 of the support member 14 are static and include a list or manifest of materials, and items I associated therewith, and this listing of items or manifest is communicated to a local signal recognition system 20 at the collection point, the deployment point, the destination point or any other point in time. Accordingly, in this embodiment, it is the portable signal recognition system 64 that recognizes to the item I level, and this information is communicated either to the local signal recognition system 20 and/or directly to the network system 46. Accordingly, the network system 46 is capable of obtaining all information regarding the whereabouts of each individual item I, carton C, support member 14, pallet 32, cabinet 34, shipping container 44, or any other component or subcomponent of the identification system 10.

Also as seen in FIG. 7, this deployment pallet or support member 14 can be transferred or shipped to a specified destination 72, such as a warehouse, a hospital, a storage area, a field site, or other similar destination. For example, as illustrated in FIG. 7, this destination 72 is a hospital. It is envisioned that the portable signal recognition system 64, the local signal recognition system 20, the network system 46 and/or the destination system 74 may be equipped with the appropriate software and application to provide an accurate manifest 54 of goods for any particular location, down to the exact spot within that location.

Once the items I arrive at the destination 72, they are then logged into or otherwise scanned by a destination system 74, which may be in the form of a local signal recognition system 20 or the like. However, it is also envisioned that this destination system 74 may be a third-party inventory system that is capable of communicating with and integratable with the identification system 10. In addition, the destination system 74 may be in communication with the network system 46, such that the identification system 10 can track the item I at any point in time from origination point all the way through destination point, where the item I is used. Accordingly, the identification system 10 of the present invention represents a wholly integrated and hierarchical total asset visibility system.

Figure 8:
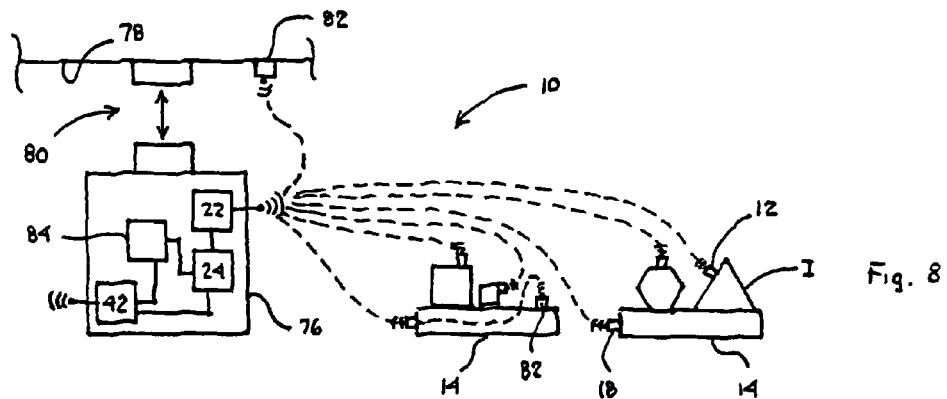
FIG. 8 is a schematic view of one embodiment of a recognition system according to the principles of the present invention.

Turning now to FIG. 8, another novel feature of the identification system 10 of the present invention is the portability of the local signal recognition system 20. For example, as seen in FIG. 8, the local signal recognition system 20 may be positioned in a housing 76, which is attachable to a surface 78 of the shipping container 44. Accordingly, this housing 76 is capable of being removed and transferred from one shipping container 44 to another shipping container 44. By simply removing and reattaching the housing 76 (and its contents), the local signal recognition system 20 represents an encapsulated inventory system for use in connection with identifying the contents of any shipping container 44 in which it is placed.

In order to attach the housing 76 to the surface 78 of the shipping container 44, an attaching arrangement 80 is utilized. This attaching arrangement 80 may take many forms, such as slots, grooves, magnets, shelving, sleeves, pins, brackets, etc. While it does not necessarily have to be directly attached to the surface 78, it is often beneficial to do so in order to prevent any movement of the local signal recognition system 20 during transfer and movement of the shipping container 44.

In another embodiment, and also illustrated in FIG. 8, is the use of a condition tracking device 82. This condition tracking device 82 may be in communication with the item I, the carton C, the support member 14, the item signal emitting device 12, the support member signal emitting device 18, the shipping container 44, the local signal recognition system 20, a portable signal recognition system 64, or any other of the components and subcomponents of the identification system 10. The condition tracking device 82 is configured to emit a signal, such as a location signal, an identification signal, a condition signal, a system signal, an environmental signal, a sensed condition, a sensed characteristic, a physical state, a physical condition, a chemical state, a chemical condition, a status signal, a warning signal, etc.

For example, the condition tracking device 82 may be in the form of a sensor for sensing the temperature, humidity, pressure, motion, product data, or any of a variety of physical data, states, conditions, and sensed and measurable characteristics. For example, this condition tracking device 82 can be used to obtain and transmit data associated with shipping data, location data, point-of-origin data, destination data, product data, expiry data, recall data, product demand data, condition data, system data, environmental data, sensed condition data, sensed characteristic data, physical state data, physical condition data, chemical state data, chemical condition data, status data, warning data, etc. Still further, this condition tracking device 82 can be used to alert the network system 46 regarding the removal, transfer, tampering or other interaction with the local signal recognition system 20, the portable signal recognition system 64, the contents of the container 44, etc. All this data can be received, processed or transmitted amongst the various systems and subsystems of the identification system 10.

It is further envisioned that the local signal recognition system 20, portable signal recognition system 64, or even the shipping container 44 itself, may include an alert system 84, which may communicate an alert condition or a warning signal based upon any of the data received by the condition tracking device 82. For example, an alert or warning signal may be sent to the user of the network system 46 if a shipping container 46 has been damaged or otherwise tampered with, if the local signal recognition system 20 has been damaged, manipulated or transferred, or if certain conditions in the shipping container or in connection with the items I therein reach predetermined states or levels. Further this alert system 84 mat be integrated with or controlled by the control device 24 of the local signal recognition system 20.

Figure 9:
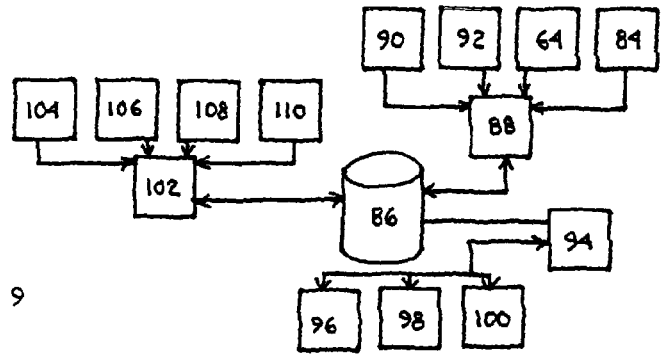
FIG. 9 is a schematic view of one embodiment of a computer-implemented method for use in connection with a recognition system according to the principles of the present invention.
Figure 10:
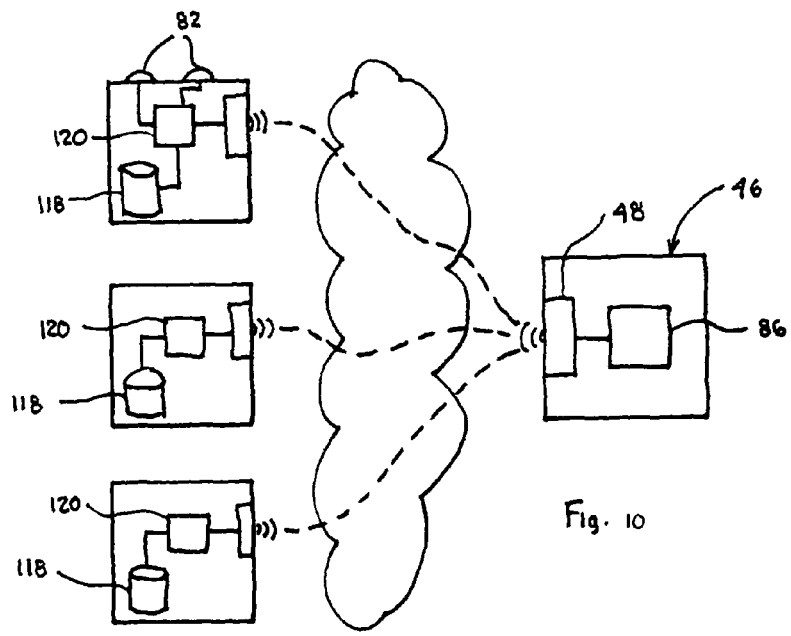
FIG. 10 is a schematic view of another embodiment of a computer-implemented method for use in connection with a recognition system according to the principles of the present invention.

One preferred embodiment of the software system and overall inventory management application for use in connection with the identification system 10 is illustrated in FIGS. 9 and 10. As seen in FIG. 9, in one form, the system may include a central database 86, which serves as the data warehouse for all incoming signals and data for use in managing the identification system 10. A process layer 88 is in communication with the central database 86, and allows for communication with a desktop PC 90, a web interface 92, the portable signal recognition system 64, and the alert system 84.

The central database 86 is also used in connection with an integration layer 94. The integration layer 94 is used to interact with and communicate with various other systems, such as a billing system 96, an inventory management system 98 or some other third party application 100. Finally, in this embodiment, a gate layer 102 is in communication with the central database 86. This gate layer 102 is used for providing a communications platform for data signal receipt, processing and transfer. For example, this gate layer 102 may be used for communications and signals received from a component 104 operating at 13.56 MHz, component 106 operating at 915 MHz, component 108 operating at 433 MHz, a barcode component 110, etc.

In addition, the software may take different forms, such as a standalone application and a network or web application. The standalone application is deployable as a self-contained executable on the relevant control device or computing device, and can be run independently on a computer without any network interaction. In one embodiment, the standalone application would include device driver software used to control hardware, such as RFID readers, temperature sensors, etc. In addition, the executable or standalone application can be programmed to perform network interaction for the sake of updating on a remote computer.

The network application may be in the form of a client-server architecture. For example, this type of application may be called or operated from within a web browser on the relevant computer. Typically, there would be no need for installation of any software on the computer, and any standard browser available on the operating system will be sufficient to act as a client to connect to the server. This application may run within the browser communicating to the remote application server somewhere on the network using HTTP protocol. A remote application server may have an executable or standalone application running at all times and may also serve as the central database 86.

Another preferred and non-limiting embodiment of the software system, and in particular the network capability of this system, is illustrated in FIG. 10. For example, in this embodiment, the local signal recognition system 20, the portable signal recognition system 54 and the drivers to create the manifest 54 are standalone applications that can be used for device management, while providing a graphical user interface to the user. In this example, the three applications will communicate with the central database 86 of the network system 46. Each of these applications may include a local database 118, as well as an associated RFID reader 120. In addition, the local signal recognition system 20 may be in communication with the above-discussed condition tracking device 82.

The network system 46 may include a web application, along with the central database 86. Of course, it is envisioned that the central database 86 may be stored at an offline and secure location. The network system 46 stores the status information regarding all of the shipping containers 44 and identifies items I that have been provided to various destinations. Specific user views may be provided over a browser by the web application to various other third-party units or stations. All of the data can be synchronized appropriately over and through use of the network system 46, and any authorized user can connect over a secure network and view status information about items I. In one embodiment, the local signal recognition system 20 communications with the shipping container 44 and manages the various hardware and data collected by the components within the container 44. The manifest 54 application may communicate with any of the support members 14, items I, etc. and manage the hardware and data collected by the individual signal receiving devices or RFID readers 120. Again, the identification system 10, using the hardware and software components, provide for an accurate view of the entire inventory of items I, equipment, shipping containers 44 and other transported systems throughout the world.

Figure 11:
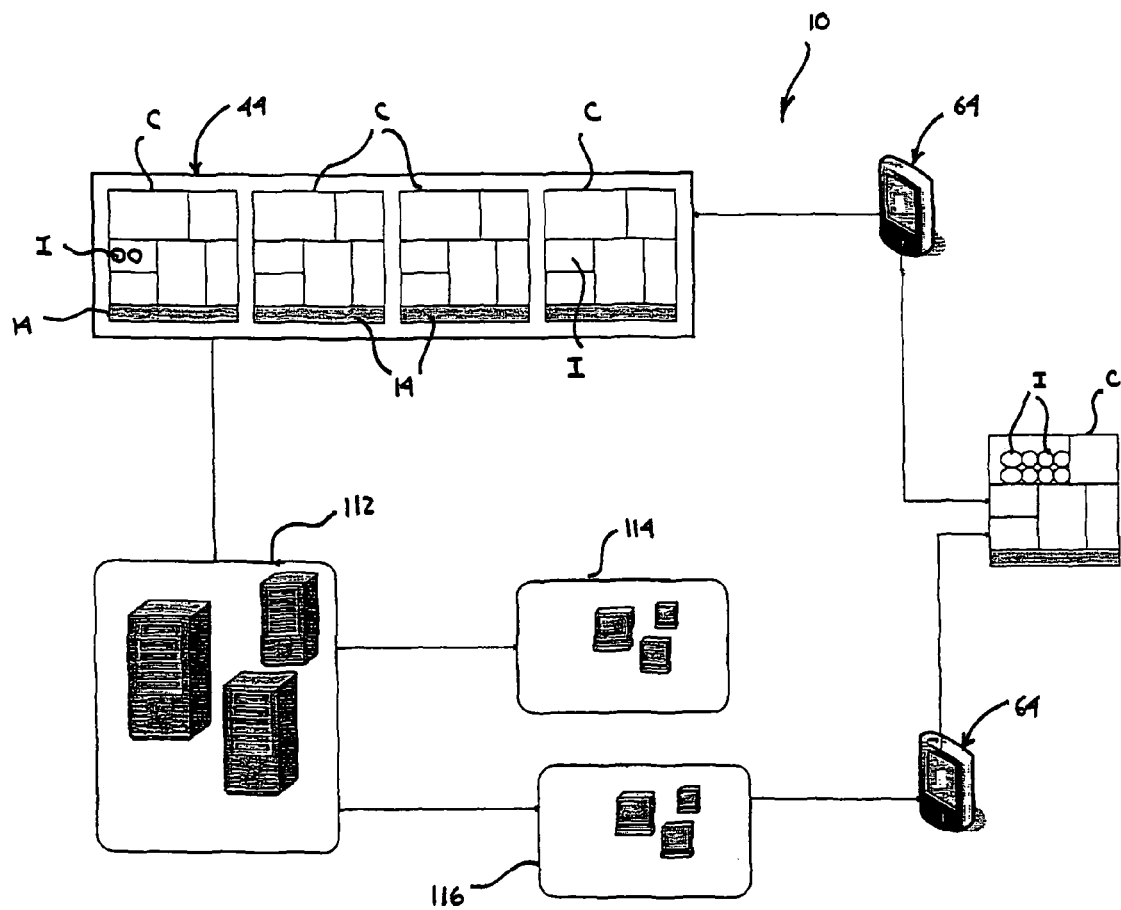
FIG. 11 is a schematic view of a still further embodiment of a recognition system according to the principles of the present invention.

Another example of the present identification system 10 in use in a military/deployment application is illustrated in FIG. 11. For example, once a shipping container 44 arrives in a staging area, it is accessed and connected to the local network, such as the network system 46. Next, a soldier, such as the Quarter Master, may create a pick-list on the portable signal recognition system 64 based upon a tick sheet from a field hospital. Next, a soldier scans cartons C and/or items I in the shipping container 44 and/or the support members 14 and places them on a deployment pallet 32 if they match this list. Once the deployment pallet is created, a deployment manifest 54 is created by the portable signal recognition system 64 and sent back to the local signal recognition system 20 and/or network system 46.

At this point, the shipping container 44 (and specifically the local signal recognition system 20) may perform a re-scan to reconcile the inventory, such as the cartons C and/or items I removed, by subtracting the deployment manifest 54 from the existing manifest 54 or data associated therewith in the local signal recognition system 20. Next, the local signal recognition system 20 communicates with a staging area data center 112 that communicates the appropriate information regarding the contents of the shipping container 44, support members 14 and/or deployment pallet 32.

The manager of the staging area receives an alert as to the changes in inventories and views the reconciled data at the staging area office 114. In addition, a field unit 116 receives various alerts about the deployment pallet 32 and contents thereof. This deployment pallet 32 inventory and data is downloaded or transferred to a portable signal recognition system 64. Accordingly, once the deployment pallet 32 arrives at, e.g., the field hospital, the portable signal recognition system 64 is used to track the daily inventory levels against the downloaded manifest 54.

In this embodiment, the staging area data center 112 is a central depository of all critical information collected from the site or location (or possibly various locations across the world). Some advantages of such a data center are its ability to manage and understand the rules and user authorization levels for data tracking within the system 10. Another advantage is the ability to engage in appropriate data monitoring for specific purposes since the data is collected over a period of time. This provides the scope for creating statistical reports, which may be of high strategic value to senior management personnel. For example, by viewing past data trends, better strategies can be evolved for future deployments.

As discussed above, any number of communications networks and passageways are envisioned. For example, in one embodiment, a mobile satellite terminal may be used to engage in tracking and remote monitoring functions. Such a terminal may offer direct interfaces to many application environments without the need for additional external circuitry, which would significantly reduce system integration costs and may be a key component in a range of customized direct-to-desktop solutions. The use of this mobile satellite terminal may enable the user to understand the position status of mobile assets, including personnel, and may allow for the monitoring from any location without an Internet connection. Accordingly, the use of a mobile satellite terminal may provide an increase in supply chain management efficiency, as well as a greatly enhanced security, with a cost-savings at many levels.

As discussed above, the support member 14 may take many forms. For example, the support member 14 may be a pallet 32 or a cabinet 34. However, the support member 14 may also be a container, a drawer, a shelf, a box, a shipping container 44, a platform, a disassemblable container, a disposable container, a bulk liquid container, etc. For example, the support member 14 and shipping container 44 may be in the form of a modular shipping container, as shown and described in application Ser. No. 11/222,065. The identification system 10 of the present invention may be easily integrated with and used in connection with such a modular shipping platform.

In another embodiment, the present invention provides an identification system 10 that uses a hierarchical or parent/child relationship between the various levels. This allows for the appropriate flow of data and communication between the various components and subcomponents, as well as locations, that are used throughout the system 10. One such parent/child relationship system is illustrated in Table 1.

TABLE 1

Parent/Child Relationship System

| Level | Code | Interaction with other levels | Parent/Children | Components |
|---|---|---|---|---|
| Depot | 0 | Depot receive replenishment orders from sea basing units. Containers are filled up and shipped to the sea basing unit that put in the order | Parent: None Children: SeaBase | Access to information in all locations to corporate intranet via Intelliware |
| Location-Sea base/ Staging/ Field Hospital | 1 | SeaBasing & Staging would contain containers and the service officer would be able to access the container level information either by using the iPAQ near the container or via a network connected computer | SeaBase Parent: Depot Children: Staging Staging Parent: Seabase Children: Container | iPAQ, Connectivity via Laptop to Intranet/ Network via Intelliware |
| Container | 2 | The container has a battery assisted passive tag, which stores information | Parent: Staging Children: Pallet | Battery assisted Passive Tag, Readers, Antennas, Power |

TABLE 1-continued

Parent/Child Relationship System

| Level | Code | Interaction with other levels | Parent/ Children | Components |
|---|---|---|---|---|
| | | regarding the pallets that it contains. | | Connections, Battery, Intranet/ Network Connectivity via Satellite to central database, GPS, Motion Sensors, Temperature Sensors |
| Pallet (Quad) | 3 | A pallet contains a passive Tag stores all the pallet level information residing in the pallet and transmits this data to the container when queried | Parent: Container Children: Case | Passive Tag |
| Case/ Smart Chest/ Cabinet/ Carton | 4 | A case contains a passive Tag & stores all the item level information residing in the case and transmits this data to the pallet when queried | Parent: Pallet Children: Item | Passive Tag |
| Item | 5 | Individual item information is stored on the passive tag and is transmitted to the case when queried. | Parent: Case Children: None | Passive Tag |

Accordingly, the present invention provides a transferable warehouse management system, which may prompt an alert as to its installation and removal. In addition, the identification system 10 creates an electronic manifest 54 and may permit a user to identify points-of-origin, points-of-destination, content information, environmental conditions, etc. Upon distribution of the content, an electronic deployment manifest 54 may be created to alert a recipient that supplies are on the way. The use of the items I can be monitored by quickly scanning the inventory at the end of the day. The present invention provides for selective on-off-loading, as well as the ability to sense environmental conditions and respond if those conditions are out of tolerance. In addition, the identification system 10 can be used for automated replenishment to provide fresh and safe goods by responding to expiration dates, product recalls and product demand. Further, the identification system 10 can communicate through various communications networks that consist of a mixture of short-range and long-range communications. Still further, the identification system 10 may be used as an internationally-compliant UHF RFID reader and antenna system.

In this manner, the present invention provides an identification system 10 that provides for total asset visibility and effective supply chain management. Through interaction between the various components and subcomponents of the system 10, the present invention provides a full-scale and interconnected network and node-driven view of all assets and shipping entities. In addition, the identification system 10 provides a portable, transferable and movable local signal recognition system 20 that can be used in connection with a variety of containers. Therefore, the system does not need to be disposed of with any particular container, and can be easily transferred and moved to allow for the re-use, disposal or return of the previous shipping container 44. Still further, the present invention provides for a unique nesting of radio frequencies that allows for the beneficial use of these various frequencies to obtain a more complete picture of inventory, down to the item I level. Accordingly, the present invention provides an identification system 10 that is a unique and systemic approach to accurate and efficient worldwide inventory systems.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An identification system for recognizing at least one item signal emitting device operating at a first frequency and affixed to at least one item, the system comprising:
    at least one support member, including:
        (i) at least one support surface configured to support the at least one item thereon; and
        (ii) at least one support member signal emitting device operating at a second, different frequency and affixed to the at least one support member; and
    a local signal recognition system, including:
        (i) a signal receiving device communicating with the at least one support member and configured to receive signals emitted from the at least one item signal emitting device, the at least one support member signal emitting device or any combination thereof; and
        (ii) a control device for receiving, processing and transmitting signals;
    a network system, including:
        (i) a signal receiving device configured to receive signals emitted from at least one of: the local signal recognition system, the at least one item signal emitting device, the at least one support member signal receiving device, or any combination thereof;
        (ii) a control device for receiving, processing, and transmitting signals; and
    software configured to:
        generate at least one manifest associated with at least one of the following: the at least one item, the at least one support surface, at least one shipping container associated with the at least one item or the at least one support surface, or any combination thereof; and
        locally store and associate the at least one manifest with at least one of the following: the at least one item, the at least one support surface, at least one shipping container associated with the at least one item or the at least one support surface, or any combination thereof;
    wherein the at least one manifest includes at least one of the following: a shipping container identity, an item identity, a support member identity, a signal emitting device identity, data associated with a container, data associated with an item, data associated with a support member, data associated with a signal emitting device, a default inventory, an updated inventory, an item inventory, a support member inventory, user data, access data, user/item association data, user/support member association data, user/shipping container data, a default data set, an updated data set, shipping data, location data, point-of-origin data, destination data, product data, expiry data, recall data, product demand data, condition data, system data, environmental data, sensed condition data, sensed characteristic data, physical state data, physical condition data, chemical state data, chemical condition data, status data, warning data, or any combination thereof;

wherein the signal receiving device of the local signal recognition system is configured to receive and read signals emitted from the at least one item signal emitting device operating at the first frequency and the at least one support member signal emitting device operating at the second frequency simultaneously.

2. The system of claim 1, wherein the local signal recognition system further comprises a configurable tuning mechanism configured to be modified to receive a plurality of signals having different and discrete frequencies.

3. The system of claim 1, wherein the first frequency and the second frequency are radio frequencies, and wherein the first frequency is about 13.56 MHz and the second frequency is about 915 MHz.

4. The system of claim 1, wherein the at least one support member further comprises a signal receiving device configured to receive signals emitted from the at least one item signal emitting device in the first frequency, and a support member control device configured to receive, process and transmit signals, wherein the support member control device communicates with the local signal recognition system.

5. The system of claim 4, wherein the support member control device is programmed with software to recognize at least one of: a shipping container identity, an item identity, a support member identity, a signal emitting device identity, data associated with a container, data associated with an item, data associated with a support member, data associated with a signal emitting device, a default inventory, an updated inventory, an item inventory, a support member inventory, user data, access data, user/item association data, user/support member association data, user/shipping container data, a default data set, an updated data set, shipping data, location data, point-of-origin data, destination data, product data, expiry data, recall data, product demand data, condition data, system data, environmental data, sensed condition data, sensed characteristic data, physical state data, physical condition data, chemical state data, chemical condition data, status data, warning data or any combination thereof.

6. The system of claim 5, wherein the software is configured to communicate with a specified destination in a satellite network, in or over a cellular phone network, in a computer network, over the Internet, in a web-based application, in a wireless format, in a hardwired format, over a local area network, over a wide area network, over a wireless local area network (Wi-Fi), or any combination thereof.

7. The system of claim 1, wherein the software transfers data to a specified destination in a satellite network, in or over a cellular phone network, in a computer network, over the Internet, in a web-based application, in a wireless format, in a hardwired format, over a local area network, over a wide area network, over a wireless local area network (Wi-Fi), or any combination thereof.

8. The system of claim 7, wherein the specified destination is a website, a computing device, a computer, a personal computer, a laptop, a palmtop, a personal digital assistant, a cellular phone, an electronic device, a network terminal or any combination thereof.

9. The system of claim 1, wherein the signal receiving device is an event-activated device configured to activate a scan based upon a specified event or occurrence.

10. The system of claim 9, wherein the event or occurrence is a prompt from a network, a prompt from an outside control device, a prompt from the system, an activation event, an access condition, an entry condition, a identity condition, an authorization condition, a non-event condition or any combination thereof.

11. The system of claim 1, wherein the support member is a pallet, a container, a cabinet, a drawer, a shelf, a box, a shipping container, a platform, a disassemblable container, a disposable container, a bulk liquid container or any combination thereof.

12. The system of claim 1, further comprising a portable signal recognition system including: (i) a signal receiving device affixed to the at least one support member and configured to receive signals emitted from the at least one item signal emitting device, the at least one support member signal emitting device or any combination thereof; and (ii) a control device for receiving, processing and transmitting signals.

13. The system of claim 1, wherein the item, the item signal emitting device, the support member, the support member signal emitting device, a shipping container, the local signal recognition device, a portable signal recognition device or any combination thereof is associated with a condition tracking device configured to emit a signal.

14. The system of claim 13, wherein the signal is a location signal, an identification signal, a condition signal, an system signal, an environmental signal, a sensed condition, a sensed characteristic, a physical state, a physical condition, a chemical state, a chemical condition, a status signal, a warning signal or any combination thereof.

15. An identification system for recognizing at least one signal emitting device affixed to at least one item, the system comprising:
at least one shipping container having an interior area configured to contain at least one support member, including: (i) at least one support surface configured to support the at least one item thereon; and (ii) at least one support member signal emitting device affixed to the at least one support member;
a signal recognition system, including:
(i) a signal receiving device located in and communicating with the interior area of the shipping container and configured to receive signals emitted from the at least one item signal emitting device operating at a first frequency and the at least one support member signal emitting device operating at a second frequency simultaneously;
(ii) a control device for receiving, processing and transmitting signals; and
(iii) a housing configured to at least partially contain at least one of the signal receiving device and the control device;
a security system comprising at least one locking mechanism configured to prevent unauthorized access to the interior area of the at least one shipping container; and
at least one signal-blocking material positioned on a surface of the at least one shipping container and configured to prevent signals from passing therethrough.

16. The identification system of claim 15, further comprising an alert system configured to alert or notify a user regarding the installation of at least one component of the signal recognition system, the removal of at least one component of the signal recognition system, movement of at least one component of the signal recognition system or any combination thereof.

17. The identification system of claim 15, further comprising software configured to:

generate at least one manifest associated with at least one of the following: the at least one item, the at least one support surface, at least one shipping container associated with the at least one item or the at least one support surface, or any combination thereof; and locally store and associate the at least one manifest with at least one of the following: the at least one item, the at least one support surface, at least one shipping container associated with the at least one item or the at least one support surface, or any combination thereof;

wherein the at least one manifest includes at least one of the following: a shipping container identity, an item identity, a support member identity, a signal emitting device identity, data associated with a container, data associated with an item, data associated with a support member, data associated with a signal emitting device, a default inventory, an updated inventory, an item inventory, a support member inventory, user data, access data, user/item association data, user/support member association data, user/shipping container data, a default data set, an updated data set, shipping data, location data, point-of-origin data, destination data, product data, expiry data, recall data, product demand data, condition data, system data, environmental data, sensed condition data, sensed characteristic data, physical state data, physical condition data, chemical state data, chemical condition data, status data, warning data, or any combination thereof.

18. An identification system for recognizing at least one signal emitting device affixed to at least one item, the system comprising:

at least one shipping container having an interior area configured to contain at least one support member, including: (i) at least one support surface configured to support the at least one item thereon; and (ii) at least one support member signal emitting device affixed to the at least one support member;

a signal recognition system, including:
(i) a signal receiving device communicating with the interior area of the shipping container and configured to receive signals emitted from the at least one item signal emitting device operating at a first frequency and the at least one support member signal emitting device operating at a second frequency simultaneously, wherein the signal receiving device is an event-activated device configured to activate a scan based upon a specified event or occurrence; and
(ii) a control device for receiving, processing, and transmitting signals; and at least one sensor positioned locally and configured to trigger the signal receiving device of the signal recognition system to activate a scan of at least a portion of the interior area of the at least one shipping container.

19. The identification system of claim 18, wherein the at least one sensor configured to trigger the signal receiving device is at least one of a motion sensor and a sensor that senses the opening or closing of a door associated with the at least one shipping container.

20. The identification system of claim 18, further comprising at least one sensor configured to sense at least one condition associated with the at least one shipping container.

21. The identification system of claim 20, wherein the at least one sensor configured to sense at least one condition is further configured to sense at least one of the following: temperature, humidity, pressure, motion, product data, physical data, at least one state, at least one condition, at least one sensed characteristic, at least one measurable characteristic, or any combination thereof.

22. The identification system of claim 18, further comprising software configured to:

generate at least one manifest associated with at least one of the following: the at least one item, the at least one support surface, at least one shipping container associated with the at least one item or the at least one support surface, or any combination thereof; and locally store and associate the at least one manifest with at least one of the following: the at least one item, the at least one support surface, at least one shipping container associated with the at least one item or the at least one support surface, or any combination thereof;

wherein the at least one manifest includes at least one of the following: a shipping container identity, an item identity, a support member identity, a signal emitting device identity, data associated with a container, data associated with an item, data associated with a support member, data associated with a signal emitting device, a default inventory, an updated inventory, an item inventory, a support member inventory, user data, access data, user/item association data, user/support member association data, user/shipping container data, a default data set, an updated data set, shipping data, location data, point-of-origin data, destination data, product data, expiry data, recall data, product demand data, condition data, system data, environmental data, sensed condition data, sensed characteristic data, physical state data, physical condition data, chemical state data, chemical condition data, status data, warning data, or any combination thereof.

* * * * *